(12) United States Patent
Dotsey et al.

(10) Patent No.: US 7,770,905 B2
(45) Date of Patent: Aug. 10, 2010

(54) STROLLER WHEEL SUSPENSION

(75) Inventors: Michael A. Dotsey, Pottstown, PA (US);
Patrick Nolan, Royersford, PA (US)

(73) Assignee: Graco Children's Products Inc.,
Atlanta, GA (US)

( * ) Notice: Subject to any disclaimer, the term of this patent is extended or adjusted under 35 U.S.C. 154(b) by 385 days.

(21) Appl. No.: 11/696,167

(22) Filed: Apr. 3, 2007

(65) Prior Publication Data

US 2007/0257457 A1 Nov. 8, 2007

Related U.S. Application Data

(60) Provisional application No. 60/789,240, filed on Apr. 3, 2006.

(51) Int. Cl.
*B60B 33/00* (2006.01)
(52) U.S. Cl. .............. 280/86.1; 16/18 R; 16/35 R; 16/44; 280/47.38
(58) Field of Classification Search .............. 280/5.512, 280/47.22, 47.38, 47.41, 65, 79, 124.1, 124.125, 280/647, 650, 657, 658; 301/2, 133; 267/2, 267/158, 160; 188/1.12; 16/35 D, 44
See application file for complete search history.

(56) References Cited

U.S. PATENT DOCUMENTS

| | | | | |
|---|---|---|---|---|
| 1,171,722 A | * | 2/1916 | Hough | 267/196 |
| 1,745,992 A | * | 2/1930 | Herold | 16/44 |
| 2,458,922 A | * | 1/1949 | Andresen | 16/44 |
| 2,668,049 A | * | 2/1954 | Taylor | 267/153 |
| 4,462,138 A | * | 7/1984 | Black | 16/44 |
| 4,467,496 A | * | 8/1984 | Gregg | 16/18 B |
| 4,559,669 A | * | 12/1985 | Bonzer et al. | 16/44 |
| 4,649,595 A | * | 3/1987 | Shane | 16/18 CG |

(Continued)

FOREIGN PATENT DOCUMENTS

EP 836 979 4/1998

(Continued)

OTHER PUBLICATIONS

International Search Report and Written Opinion issued in related International application No. PCT/US2007/065900 mailed Aug. 27, 2007.

(Continued)

*Primary Examiner*—S. Joseph Morano
*Assistant Examiner*—Brodie Follman
(74) *Attorney, Agent, or Firm*—Lempia Braidwood LLC

(57) ABSTRACT

A stroller wheel suspension mechanism has a generally rigid carrier with a top mounting section connectable to a stroller frame and a downward facing surface. The carrier also has a depending spring section that extends downward from the top mounting section adjacent an end of the downward facing surface and that has a generally vertically oriented surface. The carrier also has a bottom spring section that extends from the depending spring section and that has an upward facing surface. The depending and bottom spring sections are resiliently deflectable relative to the top mounting section. A wheel mount is provided on the bottom spring section. A solid body damper of a resilient, flexible material is positioned within a damper region formed adjacent the downward facing, generally vertically oriented, and upward facing surfaces of the carrier.

20 Claims, 4 Drawing Sheets

U.S. PATENT DOCUMENTS

| | | | |
|---|---|---|---|
| 5,042,590 A * | 8/1991 | Bierl et al. | 172/572 |
| 5,103,530 A * | 4/1992 | Andrisin et al. | 16/20 |
| 5,581,843 A * | 12/1996 | Purnell | 16/35 R |
| 5,709,400 A | 1/1998 | Bonnier et al. | |
| 5,967,535 A * | 10/1999 | King | 280/47.38 |
| 6,099,022 A | 8/2000 | Pring | |
| 6,193,263 B1 | 2/2001 | Lin | |
| 6,203,054 B1 | 3/2001 | Matsumoto | |
| 6,209,892 B1 | 4/2001 | Schaaf et al. | |
| 6,212,733 B1 * | 4/2001 | Yeh | 16/35 R |
| 6,398,233 B1 | 6/2002 | Liang et al. | |
| 6,446,990 B1 | 9/2002 | Nania et al. | |
| 6,499,184 B2 * | 12/2002 | Plate | 16/44 |
| 6,532,623 B1 * | 3/2003 | Watanabe | 16/35 D |
| 6,539,578 B1 | 4/2003 | Guttmann et al. | |
| 6,595,531 B2 * | 7/2003 | de Oliveira | 280/62 |
| 7,396,038 B2 | 7/2008 | Zweideck | |
| 2006/0001226 A1 | 1/2006 | Refsum | |

FOREIGN PATENT DOCUMENTS

| | | |
|---|---|---|
| FR | 911 732 | 7/1946 |
| GB | 190 889 | 1/1923 |
| GB | 327 688 | 4/1930 |
| GB | 449 775 | 7/1936 |

OTHER PUBLICATIONS

Britax Preview Lightweight Umbrella Travel System (Jun. 2004).

* cited by examiner

STROLLER WHEEL SUSPENSION

RELATED APPLICATION DATA

This patent is related to and claims priority benefit of U.S. Provisional Patent Application No. 60/789,240, which was filed on Apr. 3, 2006 and entitled "Stroller," and which is hereby incorporated by reference in its entirety

BACKGROUND OF THE INVENTION

1. Field of the Disclosure

The present disclosure is generally directed to strollers, and more particularly to a suspension mechanism for stroller wheels.

2. Description of Related Art

Strollers are known in the art to employ various types of wheel suspension mechanisms. The most common suspension system utilizes a coil spring surrounding a telescoping tube arrangement. This type of wheel suspension is typically found on the front wheels of a conventional stroller. Rear wheels on strollers often are not provided with any type of wheel suspension, even though the rear wheels tend to bear the brunt of loads and impact during use. This is because the rear wheels not only support their share of the weight of the child seat occupant, but also are subject to virtually all of the forces generated by pushing the stroller This can include significant down force when the stroller is tilted to climb a curb or the like. Some higher end strollers offer a suspension device on all four wheels, but again are typically of the coil spring design.

The conventional coil spring suspension components are very often not visible. The components are housed within a cover or housing on the wheel structure. Occasionally, such suspension systems are not covered and visible, with both the inner telescoping tube structure and the spring are typically exposed. Many strollers employ this type of suspension system and most attempt to mask or hide the coil spring via the housing. The size and visual appearance of the housing can detract from the overall aesthetic design of a stroller. Also, over time and during use, dirt and debris gets captured the housing. The components become dirty, collect contaminants, and the like, which can limit suspension travel, reduce the resiliency of the spring, and can add friction to the sliding tube components. This can also create wheel squeak or squeal during use of the stroller. The performance of suspension systems of this type that are left uncovered can deteriorate even quicker.

Three wheeled strollers typically have only one wheel or wheel assembly in the front of the stroller. Thus, the front wheel assembly will be subjected to about twice as much load, impact force, and abuse as any one of the pair of front wheel assemblies on a conventional four wheeled stroller. The wear and tear on a typical front wheel assembly on a three wheeled stroller can cause premature deterioration and even failure of the suspension assembly components. And can result in a rather harsh ride for the stroller occupant.

These known suspension systems employ several components that must be manufactured separately and assembled. This adds cost and complexity to the stroller product. These systems also have moving parts that rub against one another. Such components are thus susceptible to wear, contamination, squeaking, and squealing. Further, as the parts deteriorate, added friction reduces the performance of the moving parts.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The wheel suspension examples disclosed herein solve or improve upon one or more of the above noted and other problems and disadvantages with prior known stroller wheel suspension mechanisms. In one example, the disclosed wheel suspension devices eliminate the need for a coil spring and telescoping tube arrangement that is common on many strollers. In another example, the disclosed wheel suspension mechanisms have a generally solid body structure, with no parts that move relative to other parts of the mechanism. The disclosed suspension mechanism are much less susceptible to contaminants affecting their overall performance. In yet another example, the disclosed wheel suspension mechanisms can be positioned such that their appearance is masked. The devices can be difficult to recognize as suspension mechanisms, and particularly on stroller dual wheel stroller assemblies. In yet another example, the solid body configuration of the disclosed wheel suspension mechanisms can be designed to achieve any number of various aesthetic configurations in order to mask their appearance and to enhance the overall appearance of the stroller. However, doing so need not affect their performance as a suspension mechanism.

Figure 1:
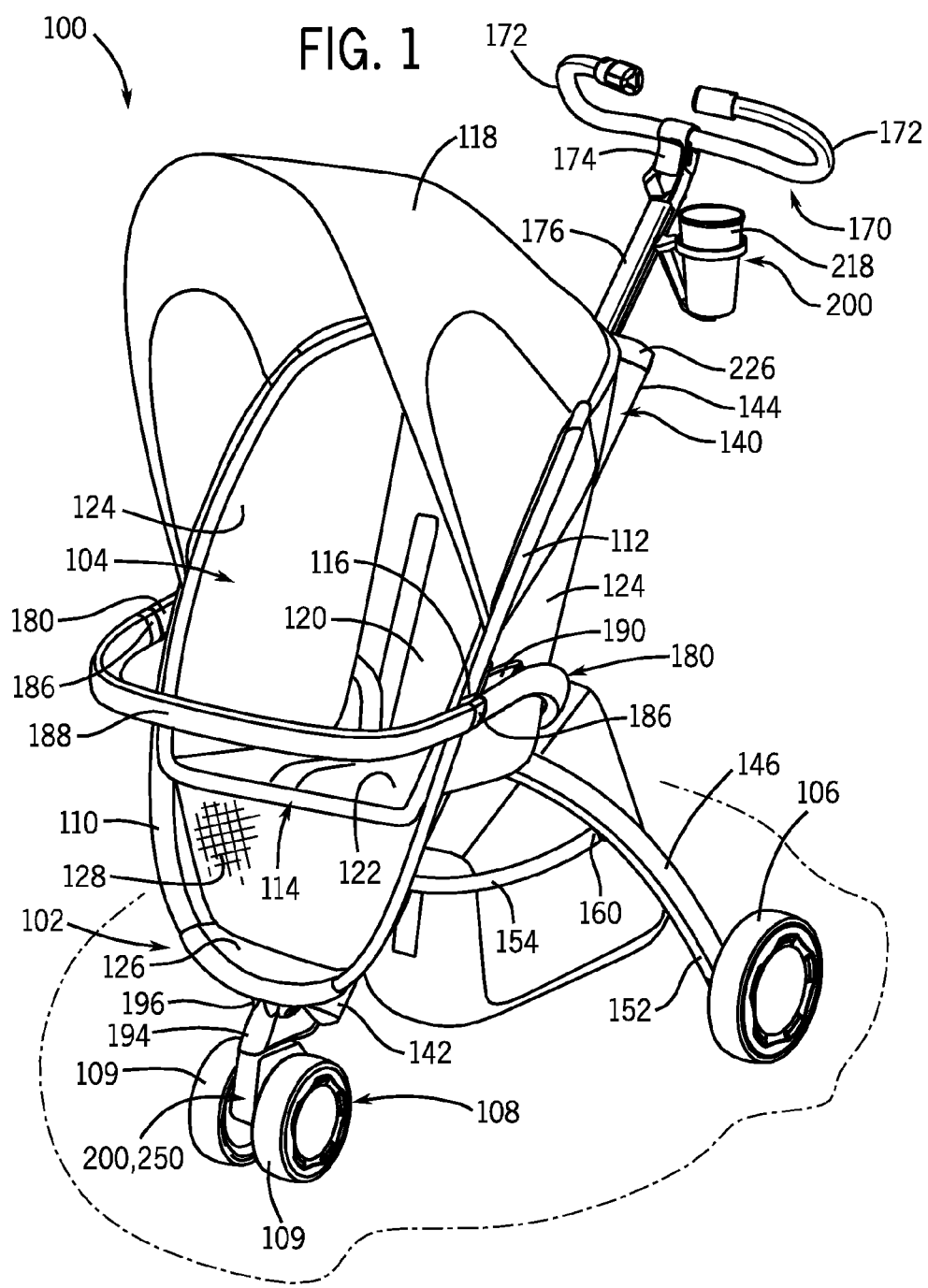
FIG. 1 shows a perspective view of one example of a stroller assembly with a wheel suspension mechanism constructed in accordance with the teachings of the present invention.

Turning now to the drawings, a stroller 100 is depicted in FIG. 1 and is constructed in accordance with the teachings of the present invention. In the disclosed example, the stroller 100 generally has a frame assembly 102, a seat assembly 104 supported by the frame assembly, and a plurality of wheels supporting the frame assembly on a ground surface. In general, the frame assembly 102 in the disclosed example includes a pair of rear wheels 106 and a single front wheel assembly 108 positioned forward of and at a mid point between the rear wheels. In this E example, the front wheel assembly has two wheels 109 spaced apart side by side.

The frame assembly 102 in this example generally has a seat mounting frame 110 that is a U-shaped component. In the disclosed example, the seat assembly 104 can be removed from the seat frame 110 and the stroller 100. In general, the removable seat assembly 104 includes a pair of seat attachment tubes 112 positioned on opposite sides of an occupant seat 114. The seat tubes 112 are connected to and can be removed from upper ends 116 of the seat frame 110. The seat 114 of the seat assembly 104 is supported on the stroller at least in part by the seat tubes 112 and has a canopy 118 connected to an upper part of the seat. The seat 114 also has a seat back 120, a seat bottom 122, and seat side wings 124 positioned on opposite sides of the seat back and the seat bottom.

A footrest 126 is positioned at the bottom of the seat assembly 104 and is suspended from the front edge of the seat bottom 122 by a mesh fabric panel 128 in this example. The footrest 126 is also connected to the lower part of the seat frame 110. In the disclosed example, the seat 104 can be made entirely of fabric or like materials and be suspended from the seat tubes 112 and the seat frame 110, when attached. Alternatively, portions of the seat assembly 104 can have a removable cover placed over a generally rigid supporting structure that defines and shapes at least part of the seat, such as the seat bottom 122 and parts of the seat side wings 124. Thus, once attached to the seat frame 110, the seat assembly 104 can be sufficiently supported on the stroller and substantial enough to support the weight of a child occupant. As will be evident to those having ordinary skill in the art, the configuration and construction of the seat assembly 104 and the seat 114 can vary considerably and yet fall within the spirit and scope of the present invention.

The stroller frame assembly 102 in the disclosed example generally has a central spine 140 with a lower end 142 positioned near the front wheel assembly 108. The spine 140 also has an upper end 144 positioned behind the seat back 120 of the seat assembly 114 and between the rear wheels 106. A pair of curved rear legs 146 extends downward in opposite directions from an underside of the spine 140. Each leg 146 is bowed outward and extends in a rearward and downward direction. A proximal or top end of each leg is coupled to a rear leg connector (not shown) positioned on the underside of the spine 140. The connector is positioned in this example about mid-point between the upper end 144 and the lower end 142 of the spine 140. A distal or lower end 152 of each rear leg 146 in this example carries one of the rear wheels 106.

A rear leg link 154 is positioned on each side of the frame assembly 102 and links each rear leg 146 to the spine 40. Each link 154 has one end coupled to a connector (not shown) on the underside of the spine 140 positioned below the rear leg connector along the spine. Each link 154 also has another end 160 coupled to a corresponding one of the rear legs 146. The links 154 provide stability for the stroller frame assembly 102, and particularly for the rear legs 146, during use.

The frame assembly 102 in the disclosed example also has a stroller handle 170 for pushing and maneuvering the stroller 100. The disclosed handle 170 generally has an upward facing, open C-shape that forms two handle sections 172. The two sections 172 extend in opposite directions from a handle bracket 174. The handle bracket 174 is coupled to a stanchion 176 that extends from the upper end 144 of the frame spine 140. In the disclosed example, the stanchion 176 is essentially a linear structure and extends parallel to and is aligned with the spine 140, which is also a generally linear structure.

The spine 140 is oriented centrally between the rear wheels 106 and defines a central or longitudinal axis of the stroller 100. In the disclosed example as shown in FIG. 1, the spine 140 is oriented at an angle with a low point at its lower end 142 and a high point at its upper end 144. The spine is oriented to position the handle 170 so that a caregiver can stand behind the stroller and push the stroller in a conventional manner by the handle 170. The seat assembly 104 is positioned above and forward of the spine 140 and faces forward relative to the stroller 100 away from the handle 170. However, the arrangement of the seat and frame components disclosed herein can vary and yet fall within the spirit and scope of the present invention. Additionally, the shape and configuration of the various frame assembly and seat assembly components can also vary considerably from the example shown without departing from the spirit and scope of the present invention.

The stroller 100 disclosed herein also has a pair of curved seat frame support arms 180. The support arms 180 extend upward in opposite directions from the top side of the spine 140. Each support arm 180 is bowed outward and extends in a forward and upward direction relative to the spine 140. A proximal or bottom end of each support arm 180 is coupled to a support arm connector (not shown) positioned on the top side of the spine 140. The support arm connector in this example is positioned at the same location along the spine as the rear leg connector, which is on the underside of the spine. A distal end portion 186 of each support arm 180 is bent downward, extends generally horizontally forward, and terminates at an exposed end or face. An arm bar 188 is attached to the two exposed ends of the support arms 180.

In this example, a seat frame link 190 is positioned on each side of the seat frame 110 and extends in a rearward direction. Each seat link 190 has a free end 192 that is coupled to one of the support arms 180. The connection point between each seat link 190 and the respective support arm 180 in this example is spaced rearward from the exposed end along the distal end portion 186.

Also in the disclosed example, a frame bracket 194 is located at the lower front portion of the frame assembly 102. The frame bracket 194 is connected to the lower most portion 196 of the seat frame 110 and to the lower end 142 of the spine 140. The front wheel assembly 108 is mounted to and extends downward from the frame bracket 194. The frame bracket 194 links the spine 140 to the seat frame 110 and provides the mounting location for the front wheel assembly 108 in the disclosed example.

The spine 140 is oriented centrally between the rear wheels 106 and defines a central or longitudinal axis of the stroller 100. In the disclosed example as shown in FIG. 1, the spine 140 is oriented at an angle with a low point at its lower end 142 and a high point at its upper end 144. The spine is oriented to position the handle 170 so that a caregiver can stand behind the stroller and push the stroller in a conventional manner by the handle 170. The seat assembly 104 is positioned above and forward of the spine 140 and faces forward relative to the stroller 100 away from the handle 170. However, the arrangement of the seat and frame components disclosed herein can vary and yet fall within the spirit and scope of the present invention. Additionally, the shape, size, configuration, orientation, and location of the various frame assembly and seat assembly components can also vary from the example shown without departing from the spirit and scope of the present invention.

In one example, the above stroller construction can be formed as a fixed structure that cannot be collapsed or folded. Such a stroller configuration would still provide a generally lightweight, easy to maneuver configuration. The stroller would be simpler in construction than an ordinary box-type frame stroller configuration and require fewer components to create the structure. In another example, the stroller 100 disclosed herein can be collapsible or foldable to a smaller configuration for storage and transport.

Figure 2:
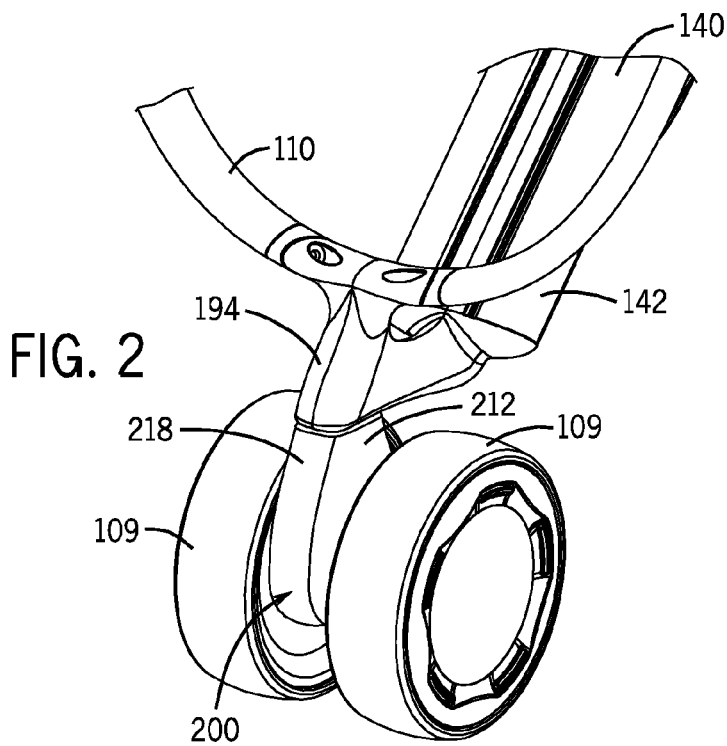
FIG. 2 shows an enlarged perspective view of the front wheel assembly and wheel suspension mechanism of the stroller in FIG. 1.
Figure 3:
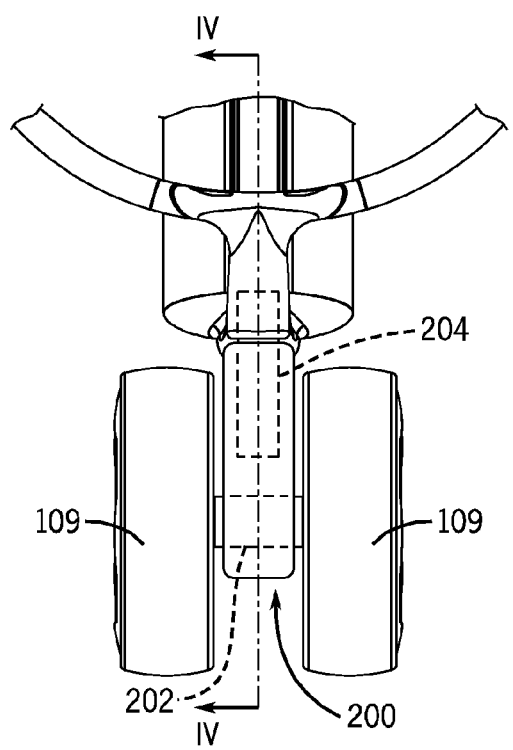
FIG. 3 shows a front view of the wheel assembly and suspension mechanism in FIG. 2.
Figure 4:
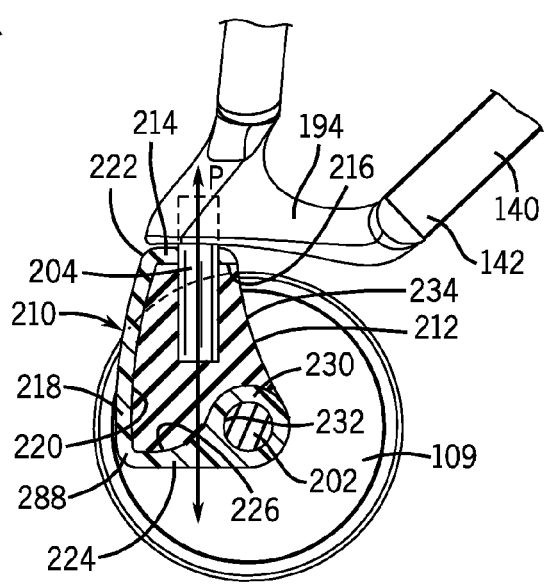
FIG. 4 shows a cross section taken along line IV-IV of the suspension mechanism shown in FIG. 3.

In accordance with the teachings of the present invention, the stroller 100 disclosed herein has a suspension mechanism. One example of a suspension 200 is provided as a part of the front wheel assembly 108 and is shown in FIGS. 2-4. The mechanism 200 is disposed between the front wheels 109 on the wheel assembly. In this example, the front wheels 109 are carried on a common axle 202. The axle 202 extends between and interconnects with hubs (not shown) of the front wheels 109 as is known in the art. In this example, the suspension mechanism 200 is rotationally connected to an underside of the frame bracket 194 and depends downward therefrom. A swivel pin 204 connects the wheel assembly 108 to the bracket 194 in a manner permitting the mechanism 200 and thus the wheel assembly 108 to swivel rotationally about an axis P of the pin. A swivel lock (not shown) can be provided as a part of the assembly 108 and the bracket 194 to permit a user to selectively lock out (disable) the swivel function, as is also know in the art. Alternatively, the wheel assembly can be fixedly attached to the frame bracket 194 or another part of the stroller with no swivel capability. As will be evident to those having ordinary skill in the art, the structure of the pin 204 and the manner in which the wheel assembly 108 is connected to the stroller can vary without departing from the spirit and scope of the present invention.

The suspension mechanism 200 shown in FIG. 4 includes a carrier or spring 210 and a resilient body 212 retained by the spring. In the example shown herein, the carrier 210 has a top mounting section 214 that is generally horizontally oriented and pivotally coupled to the underside of the frame bracket 194. The top mounting section has a relatively thin profile or thickness and a relatively substantial width, such as between the wheels 109 on the assembly. The top mounting section 214 also has a downward facing bottom surface 216. The top section need not be a linear or straight element. The section can be curved, be angled to horizontal, have varying thickness, have surface contour on any side or edge, and the like.

The carrier 210 also includes a vertically depending spring section 218 that faces forward on the stroller 100 in this example and depends from the top mounting section 214. The vertical or depending spring section 218 is also oriented generally vertically and has a rearward facing surface 220. The vertical spring section need not be a linear or straight element and need not be oriented precisely vertical. The section 218 can also be curved, be angled to vertical, have varying thickness, have surface contour on any surface or edge, and the like. The section 218 also has a relatively thin profile thickness and a relatively significant width, such as laterally between the front wheels 109. The vertical spring section 218 is integrally formed with the top mounting section 214 and is connected at a point 222 between the front end of the top section 214 and a top end of the vertical section 218. The spring section 218 can alternatively be connected to another edge or part of the top mounting section in other examples.

In the disclosed example, the carrier 210 also includes a bottom spring section 224 that extends rearward from the vertical spring section 218. The bottom spring section is oriented generally horizontally in this example and has an upward facing surface 226. The bottom spring section also need not be a linear or straight element and need not be precisely horizontal. The section 224 can also be curved, be angled to horizontal, have varying thickness, have surface contour on any surface or edge, and the like. The bottom section 224 also has a relatively thin profile thickness and a relatively significant width, such as laterally between the wheels 109 in this example. The bottom spring section 224 is integrally formed with the vertical spring section 218 as a cantilevered part. The bottom spring section 224 is connected at a point 228 between the front end of the bottom section and the bottom end of the vertical section. The bottom spring section 224 can alternatively be connected to another edge or part of the vertical spring section in other examples.

In the example shown in FIG. 4, the bottom section 224 has an axle mount 230 integrally formed as a thicker profile region on the rear end of the bottom section. The axle mount 230 has a through bore forming an axle bore 232 laterally across the bottom spring section 224. The axle 202 is received through the bore 232. Though not shown, the axle 202 can project from both ends of the bore 232 and a wheel 109 can attach to each exposed axle end in a conventional manner. Again, the configuration, size, location, and the like of the axle mount 230 can vary within the sprit and scope of the present invention.

The carrier 210 in the disclosed example forms a C-shape that is open to the rear in this example, relative to the stroller orientation. The interior of the C-shaped forms a receptacle or damper region defined by a combination of the downward facing surface 216, the rearward facing surface 220, and the upward facing surface 226 of the carrier sections. The flexible or resilient body 212 is positioned within the damper region of the carrier. In one example, the resilient body 212 has a height, longitudinal length, and lateral width sized to correspond precisely with the size, shape, and spacing of the surfaces 216, 220, and 226 of the damper region. The flexible, resilient body 212 can be formed having a smooth exterior surface 234 exposed on all sides not covered by the carrier sections. In the disclosed example, the side surfaces and rear facing surface of the resilient body 212 are exposed. These exposes surfaces can be generally planar, have a curvature or general contour, and have more detailed surface features for functional and/or decorative purposes as desired.

In one example of the present invention, the carrier 210 can be formed from a strong yet flexible material such as a plastic composite, carbon fiber, fiber embedded plastic, particle impregnated plastic, spring steel, metal impregnated plastic, or the like material. In one example, the carrier can be formed from glass reinforced NYLON or the like. The carrier material acts as a spring but also carries the wheel axle and/or axle mounts. Thus, the carrier material must be strong, durable, generally rigid, and resilient. The material must also be flexible to impart spring characteristics to the mechanism 200. During use, the axle mount 232 at the rear end of the bottom spring section 224 should be capable of moving or bending upward toward the top part of the carrier 216. The connection point 228 at the bottom end of the vertical spring part should also be capable of some movement resulting from the flexibility and resiliency of the carrier material to impart spring characteristics to the mechanism. The resiliency, strength, and durability of the carrier material will allow the carrier 210 to maintain its shape when at rest and not subject to loading or impact during use. The flexibility of the carrier material will permit the carrier 210 to flex and bend when subject to loads and impact to absorb shock at the front wheels 109 in the disclosed stroller.

The flexible, resilient body 212 can also be formed from many different materials and yet perform as intended. The material should be resilient and flexible in nature, but softer than the carrier material. Various rubber and plastic materials and compositions can be utilized. In one example, the body 212 can be formed from thermoplastic elastomer (TPE) and in another example the body can be fabricated from urethane, micro-cellular urethane, or the like. The softer more resilient TPE or other material of the body 212 can add a shock absorbing and damping aspect to the suspension mechanism. The resiliency and strength of the carrier 210 can add the spring suspension characteristic to the device.

The suspension mechanism 200 can be formed using any suitable process. In one example, the resilient body 212 and the carrier 210 can be fabricated as separate parts during separate molding procedures. The two parts can then be assembled or adhered to one another to form a unitary component. In one example, the surfaces 216, 220, and 226 can be adhered or chemically bonded to the body 212. In another example, the body 212 and carrier 210 can be co-molded or dual-molded during the same process. Such a procedure results in the materials of the two components being chemically or molecularly bonded to one another upon removal from the mold. As will be evident to those having ordinary skill in the art, the material used to fabricate the carrier 210 and the different materials used to fabricate the body 212 can vary and yet fall within the spirit and scope of the present invention.

Figure 5:
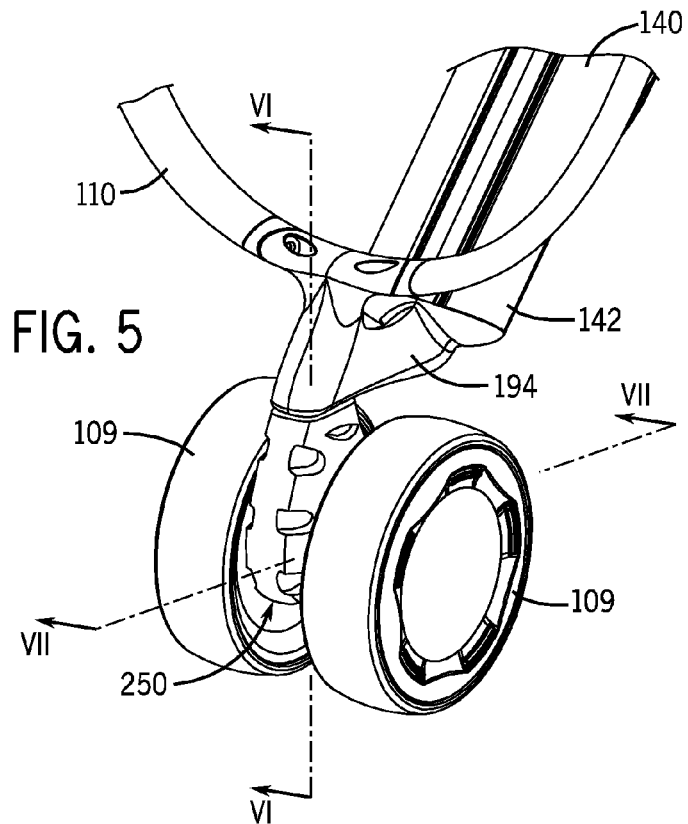
FIG. 5 shows an enlarged perspective view of another example of a front wheel assembly and wheel suspension mechanism for a stroller.
Figure 6:
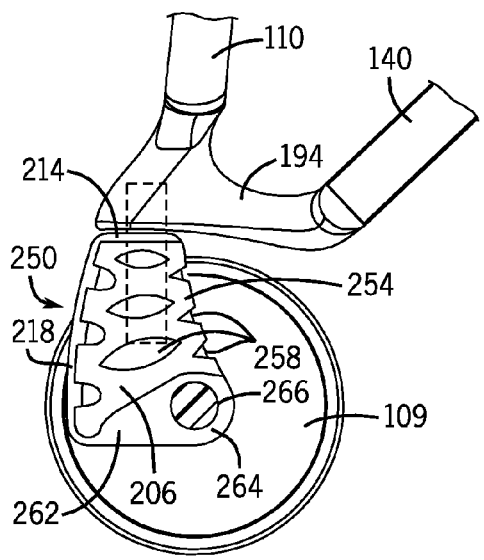
FIG. 6 shows a cross section taken along line VI-VI of the suspension mechanism of FIG. 5 and essentially taken through one axle to show one of the wheels removed.
Figure 7:
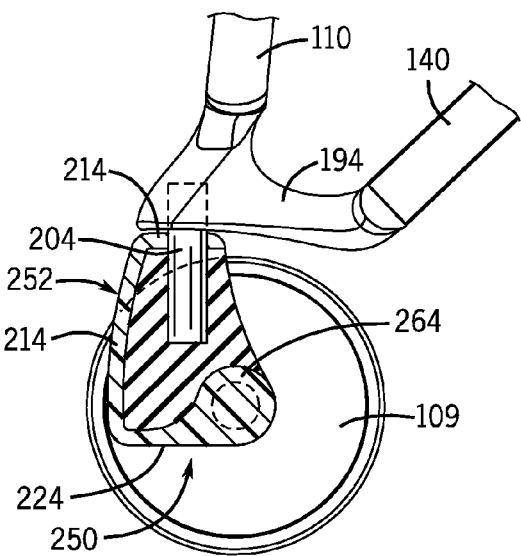
FIG. 7 shows a cross section taken along line VII-VII of the suspension mechanism of FIG. 5.

The shape and contour of the carrier 210 and body 212 can also vary and yet perform as intended. One alternative example of a suspension mechanism 250 is shown in FIGS. 5-7. The mechanism 250 has a similar C-shaped carrier 252 that extends downward from the frame bracket 194. A resilient body 254 is received in the damper region of the carrier 252. In this example, the C-shape of the carrier 252 is similar but the resilient body has surface features or contours in the form of dimples or recesses 258 formed on exposed portions of the exterior surface 260 of the body 254. Dimples 258, recesses, ribs, or other such formations and contours can be added to the resilient body 254 to alter the performance of the mechanism 250, to alter the ornamental design of the mechanism, or both. However, the suspension mechanism can still perform its intended suspension and damping functions. Additionally, as noted above the carrier 252 can also be configured differently than that shown and described herein for these same purposes.

In the example of FIGS. 5-7, the bottom spring section 262 has a thicker profile axle region 264 on the rear end of the section. However, in this example, there is no axle through bore. Instead, a pair of axles 266 project laterally outward from the region 264 in opposite directions. In this example, the axles 266 are integrally formed as part of the carrier 252 from the same carrier material. The thicker axle region 264 is solid with no holes, bores, or other perforations, rendering the bottom spring section, and particularly the axles 266 quite strong.

Utilizing a suspension mechanism 200, 250 as disclosed herein permits achieving a sleek stroller design that does not appear to employ a suspension component. The device, however, can still provide adequate or superior suspension characteristics for the wheels on which it is used. The stroller 100 can thus provide a comfortable and smooth ride for a seat occupant, can reduce jarring on a caregiver's hand as they push the stroller via the handle 170, and yet will not appear to have a large mechanical suspension mechanism on the front wheel assembly. Though the suspension mechanisms 200, 250 are described for use between a dual front wheel assembly, it is within the purview of the present invention to employ such a mechanism on stroller rear wheels and on structures with only one wheel at a particular location on the stroller. The stroller can also vary considerably from the stroller 100 described herein and yet employ the suspension mechanisms 200, 250. In yet another example, the carrier sections, the resilient bodies, or both, can be formed with perforations through portions of their components, with thinned regions, and/or with thicker regions to alter the suspension performance characteristics, the mechanism ornamental designs, or both.

Figure 8:
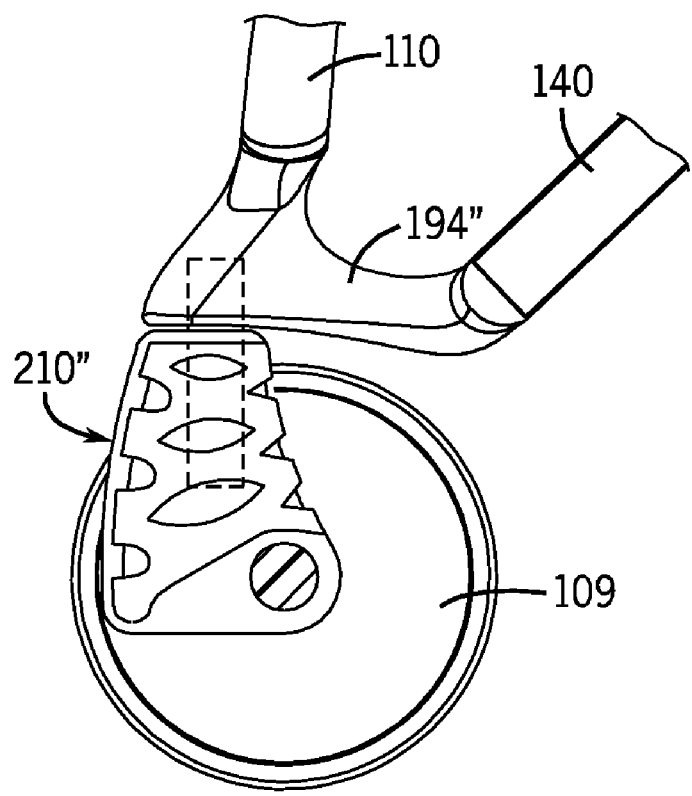
FIG. 8 shows a cut away view of another example of a stroller wheel suspension mechanism constructed in accordance with the teachings of the present invention.

The suspension mechanisms disclosed herein can be attached to a portion of the stroller in different manners from the generic swivel pin arrangements illustrated herein. For example, a carrier 210" can be molded as an integral component with the frame bracket 194" as depicted in FIG. 8 and thus be formed of the same material as the bracket.

Although certain stroller wheel suspension devices and mechanisms have been disclosed and described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller wheel suspension mechanism comprising:
   a generally stiff but resilient carrier having,
   a) a top mounting section connectable to a stroller frame, and a downward facing surface on the top mounting section,
   b) a depending spring section extending downward from the top mounting section adjacent an end of the downward facing surface, and a generally vertically oriented surface on the depending spring section, and
   c) a bottom spring section extending from the depending spring section, and an upward facing surface on the bottom spring section spaced from the downward facing surface, the depending spring section and bottom spring section being resiliently deflectable relative to the top mounting section, and the top mounting section, depending spring section, and bottom spring section being integrally formed as a unitary structure from the same resilient material; and
   d) a wheel mount provided on the bottom spring section and spaced from the depending spring section;
   a damper region bounded within the carrier by the downward facing, vertically oriented, and upward facing surfaces; and
   a solid body damper of a resilient, flexible material positioned within the damper region and connected to the downward facing, vertically oriented, and upward facing surfaces of the carrier.

2. A stroller wheel suspension mechanism according to claim 1, wherein the carrier is formed from a material selected from the group consisting of glass reinforced NYLON, carbon fiber, spring steel, or a plastic composite.

3. A stroller wheel suspension mechanism according to claim 1, wherein the solid body damper is formed from thermoplastic elastomer or micro-cellular urethane.

4. A stroller wheel suspension mechanism according to claim 1, wherein the wheel mount includes an axle bore extending laterally across the bottom spring section.

5. A stroller wheel suspension mechanism according to claim 4, wherein the axle bore is a through bore and wherein an axle protrudes beyond either side of the wheel mount on the bottom spring section.

6. A stroller wheel suspension mechanism according to claim 1, wherein the wheel mount includes an integrally formed axle protruding from at least one side of the bottom spring section.

7. A stroller wheel suspension mechanism according to claim 1, wherein the wheel mount includes a pair of integrally formed axles protruding from opposite sides of the bottom spring section.

8. A stroller wheel suspension mechanism according to claim 1, wherein the carrier and the solid body damper are molded in a dual molding process and the solid body damper is molecularly bonded to the downward facing, vertically oriented, and upward facing surfaces of the carrier.

9. A stroller wheel suspension mechanism according to claim 1, wherein the solid body damper has exposed surfaces that are not directly connected to the carrier and that have a uniform consistent surface texture.

10. A stroller wheel suspension mechanism according to claim 1, wherein the solid body damper has exposed surfaces that are not directly connected to the carrier and that have depressions formed in the exposed surfaces creating a non-uniform surface texture.

11. A stroller wheel assembly comprising:
a generally C-shaped spring with a top section connected to a stroller frame and a downward facing surface on the top section, a depending spring section extending downward from the top section adjacent one edge of the downward facing surface and having a generally vertically oriented surface, a bottom spring section extending from the depending spring section and having an upward facing surface spaced from the downward facing surface, and a damper region defined within the C-shape of the top section and the depending and bottom spring sections, the depending spring section and bottom spring section being resiliently deflectable relative to the top section;
an axle spaced from the depending spring section and carried on a free end of the bottom spring section;
at least one wheel mounted to the axle; and
a solid body damper of a resilient material positioned within the damper region and connected to the downward facing, vertically oriented, and upward facing surfaces of the spring,
wherein the top mounting section, depending spring section, and bottom spring section are integrally formed as a unitary structure from the same resilient material.

12. A stroller wheel assembly according to claim 11, wherein the axle is integrally molded as a part of the bottom spring section.

13. A stroller wheel assembly according to claim 11, wherein the axle is received in a bore formed laterally across the bottom spring section.

14. A stroller wheel assembly according to claim 11, wherein the bore is a through bore and the axle includes an exposed end projecting from opposed sides of the bottom spring section, and wherein a pair of wheels are mounted to the axle, one on each exposed end.

15. A stroller wheel assembly according to claim 11, wherein the stroller wheel assembly has a pair of wheels and the spring and solid body damper are positioned between the wheels.

16. A stroller wheel suspension mechanism according to claim 5, further comprising a pair of wheels, one mounted to the axle on either side of the bottom spring section of the carrier.

17. A stroller wheel suspension mechanism according to claim 16, wherein the solid body damper is positioned between the pair of wheels.

18. A stroller wheel suspension mechanism according to claim 1, wherein the top mounting section, depending spring section, and bottom spring section generally define a C-shaped configuration.

19. A stroller wheel assembly comprising:
a generally stiff but resilient carrier with a) a top mounting section connectable to a stroller frame and having a downward facing surface, b) a depending spring section extending downward from an end of the top mounting section and having a generally vertically oriented surface, c) a bottom spring section extending from an end of the depending spring section and having a free end and an upward facing surface spaced from the downward facing surface, and d) a damper region bounded within the carrier by the downward facing, vertically oriented, and upward facing surfaces;
a solid body damper of a resilient, flexible material positioned within the damper region and connected to the downward facing, vertically oriented, and upward facing surfaces of the carrier; and
at least one wheel mounted to the carrier near the free end of the bottom spring section,
wherein the depending spring section and bottom spring section are resiliently deflectable relative to the top mounting section and the top mounting section, depending spring section, and bottom spring section are integrally formed as a unitary structure from the same resilient material.

20. A stroller wheel assembly according to claim 19, wherein the top mounting section, depending spring section, and bottom spring section generally form a C-shaped configuration.

* * * * *